(12) United States Patent
Filsfils et al.

(10) Patent No.: US 9,590,850 B2
(45) Date of Patent: Mar. 7, 2017

(54) DISCOVERY OF CONNECTIVITY AND COMPATIBILITY IN A COMMUNICATION NETWORK

(71) Applicant: CISCO TECHNOLOGY, INC., San Jose, CA (US)

(72) Inventors: Clarence Filsfils, Brussels (BE); George Swallow, Boston, MA (US); Jean Philippe Vasseur, Dunstable, MA (US); Zafar Ali, Hicksville, NY (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 13/962,226

(22) Filed: Aug. 8, 2013

(65) Prior Publication Data
US 2015/0043570 A1 Feb. 12, 2015

(51) Int. Cl.
*H04L 12/24* (2006.01)
*H04L 12/751* (2013.01)
*H04L 12/717* (2013.01)

(52) U.S. Cl.
CPC ...... *H04L 41/0813* (2013.01); *H04L 41/0896* (2013.01); *H04L 45/02* (2013.01); *H04L 45/42* (2013.01)

(58) Field of Classification Search
CPC . H04L 41/0813; H04L 41/0896; H04L 45/02; H04L 45/42
USPC .......................................................... 370/351
See application file for complete search history.

(56) References Cited

U.S. PATENT DOCUMENTS

| | | | |
|---|---|---|---|
| 6,091,955 A * | 7/2000 | Aalto et al. .................... | 455/447 |
| 8,095,898 B1 * | 1/2012 | Wu et al. ....................... | 716/102 |
| 2002/0114036 A1 * | 8/2002 | Ghani ..................... | H04J 14/02 398/49 |
| 2003/0172362 A1 * | 9/2003 | Mack-Crane et al. .......... | 716/12 |
| 2006/0203744 A1 | 9/2006 | Patel et al. | |
| 2007/0086442 A1 * | 4/2007 | Waitzmann ................... | 370/352 |
| 2008/0062986 A1 | 3/2008 | Shand et al. | |
| 2009/0135839 A1 * | 5/2009 | Khasnabish .......... | H04L 63/164 370/401 |
| 2009/0168648 A1 * | 7/2009 | Labovitz et al. ............. | 370/229 |
| 2009/0307522 A1 * | 12/2009 | Olson et al. ....................... | 714/4 |
| 2010/0313024 A1 * | 12/2010 | Weniger et al. .............. | 713/170 |
| 2013/0007691 A1 * | 1/2013 | Lefurgy et al. ............... | 716/133 |
| 2013/0227108 A1 * | 8/2013 | Dunbar et al. ................ | 709/223 |

OTHER PUBLICATIONS

IEEE RFC 5195, H. Ould-Brahim et al., BGP-Based Auto-Discovery for Layer-1 VPNs, Jun. 2008.
IEEE RFC 5251, D. Fedyk et al., "Layer 1 VPN Basic Mode".
(Continued)

*Primary Examiner* — Andrew Chriss
*Assistant Examiner* — Ellen Kirillova
(74) *Attorney, Agent, or Firm* — Cindy Kaplan (57) ABSTRACT

In one embodiment, a method includes receiving at a node in a first network, information identifying a spare interface between a first network device in the first network and a second network device in a second network, and using the spare interface to create a path in the first network if the spare interface is compatible. The spare interface information includes connectivity and compatibility information.

20 Claims, 4 Drawing Sheets

(56) References Cited

OTHER PUBLICATIONS

IEEE RFC 5549, F. Le Faucheur et al., "Advertising IPv4 Network Layer Reachability Information with an IPv6 Next Hop", May 2009.
IEEE RFC 791, "Internet Protocol, DARPA Internet Program Protocol Specification", Sep. 1981.
IETF RFC 2460, "Internet Protocol, Version 6 (IPv6) Specification", S. Deering et al., Dec. 1998.
IETF RFC 1772, "Application of the Border Gateway Protocol in the Internet", Y. Rekhter et al., Mar. 1995.
IETF RFC 3906, "Calculating Interior Gateway Protocol (IGP) Routes Over Traffic Engineeing Tunnels", N. Shen et al., Oct. 2004.
IETF RFC 5921, "A Framework for MPLS in Transport Networks", M. Bocci et al., Jul. 2010.
IETF RFC 3785, "Use of Interior Gateway Protocol (IGP) Metric as a second MPLS Traffic Engineering (TE) Metric", F. Le Faucheur et al., May 2004.
IETF RFC 4209, "Link Mangement Protocl (LMP) for Dense Wavelength Division Multiplexing (DWDM) Optical Line Systems", A. Fredette et al. Oct. 2005.

* cited by examiner

DISCOVERY OF CONNECTIVITY AND COMPATIBILITY IN A COMMUNICATION NETWORK

TECHNICAL FIELD

The present disclosure relates generally to communication networks, and more particularly, to discovery of spare interfaces in a computer network.

BACKGROUND

In a network such as a multi-layer network, spare interfaces between nodes of the different layers may be available to accommodate new services within the network or optimize topology of the network, for example.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, an apparatus configured for operation in a first network generally comprises an interface for communication with a node in a second network, a processor for identifying the interface as a spare interface and advertising the spare interface in the first network, wherein advertising the spare interface comprises transmitting connectivity and compatibility information for the spare interface. The apparatus further includes memory for storing the connectivity and compatibility information.

In another embodiment, a method generally comprises receiving at a node in a first network, information identifying a spare interface between a first network device in the first network and a second network device in a second network, and using the spare interface to create a path in the first network if the spare interface is compatible. The spare interface information includes connectivity and compatibility information.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Nodes in a network may include spare interfaces. For example, two client nodes may have compatible spare interfaces connected to the same underlying server network. Spare interfaces between client and server nodes may be used, for example, to accommodate new services within the client layer or optimize client topology. However, the spare interfaces cannot be used unless they are known at nodes in the overlay network (e.g., distributed environment) or at a central management device (e.g., PCE (Path Computation Element) in an SDN (Software Defined Network)).

The embodiments described herein provide a single-layer mechanism to automatically discover spare interfaces connecting a first network (e.g., overlay network, client layer) to a second network (e.g., underlying network, server layer), node addresses, domain identification, and compatibility (e.g., server layer compatibility, client layer compatibility). This allows a network operator to add capacity dynamically through the network topology to accommodate new service requests. It also allows the operator to re-optimize the client topology leveraging different interconnectivity between client nodes using an underlying server path. The spare interfaces may also be used, for example, to provide spare bandwidth for additional capacity, multi-homing capability, or as a backup following a failure of a link or node. The embodiments do not require a multi-layer exhaustive topology/resource discovery and may be used to enhance IP/optical integration and IP agility.

Figure 1:
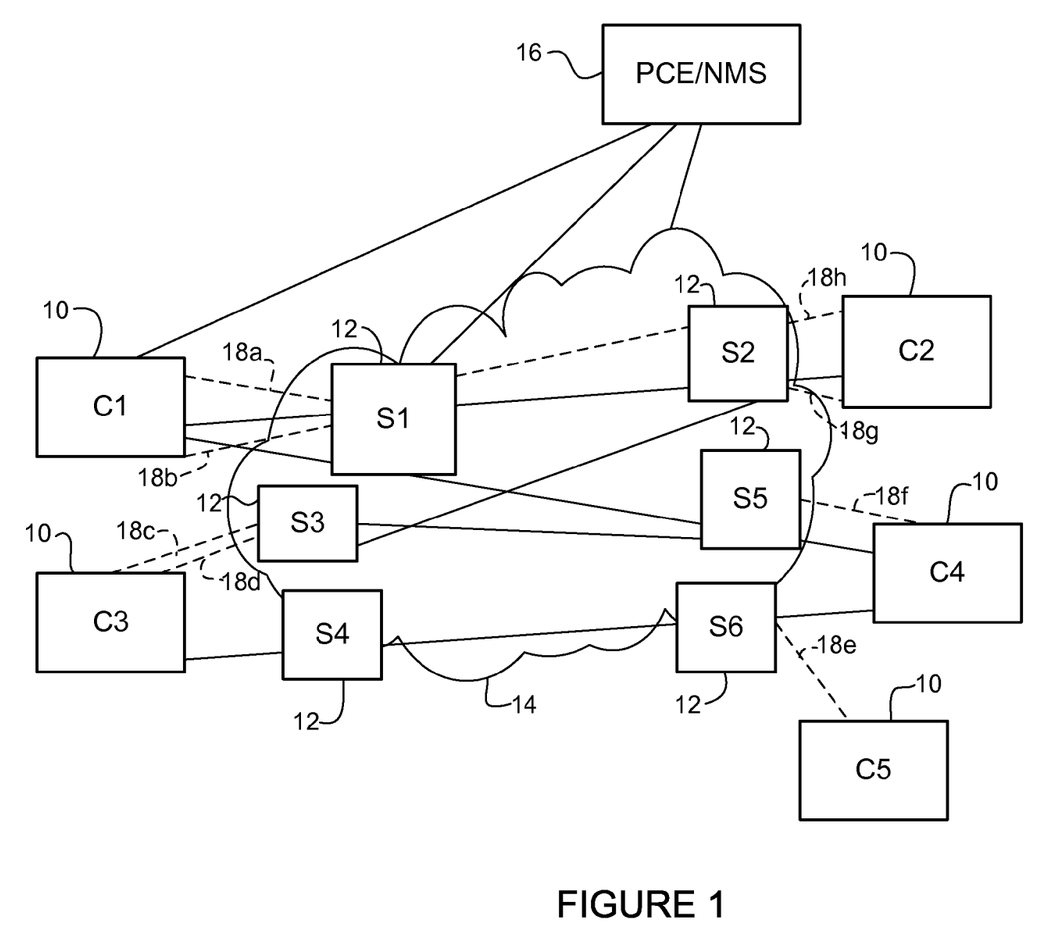
FIG. 1 illustrates an example of a network in which embodiments described herein may be implemented.

Referring now to the drawings, and first to FIG. 1, an example of a network in which embodiments described herein may be implemented is shown. The embodiments operate in the context of a data communication network including multiple network devices. The network may include any number of network devices in communication via any number of nodes (e.g., routers, switches, servers, or other network devices), which facilitate passage of data within the network. The network may be, for example, a multi-layer network, multi-domain network, single-domain network, IP over optical, IP over DWDM, or any other type of network.

In one example, the network is a multi-layer network comprising an overlay network and an underlying network. In the example shown in FIG. 1, the overlay network (first network) comprises a plurality of client nodes (client layer) and the underlying network (second network) comprises a plurality of server nodes (server layer). It is to be understood that this is only an example and other types of nodes may define the first and second networks.

The network shown in the example of FIG. 1 includes a plurality of client nodes (C1, C2, C3, C4, C5) 10 in communication with server nodes (S1, S2, S3, S4, S5, S6) 12 via links. The links between the clients 10 and servers 12 define a UNI (User Network Interface) boundary. The client nodes 10 may be client edge devices such as routers, switches, or any other network device operable to transmit, route, or forward traffic. The client nodes 10 may be connected to any number of other client nodes or networks (not shown). For example, two of the client nodes (e.g., C2 and C4, C4 and C5) may be in communication with the same client node to provide a redundant (backup) path or additional bandwidth. The server nodes 12 may be, for example, optical nodes, IP nodes, or any other network device. The clients 10 and servers 12 may communicate over one or more networks 14 (e.g., local area network, metropolitan area network, wide area network, enterprise network, data center, Internet, intranet, radio access network, public switched network, optical network, or any other network or combination thereof).

As shown in FIG. 1, the network 14 may be in communication with a management device 16 (e.g., PCE (Path Computation Element), NMS (Network Management Station), or other network device). The management device 16 has knowledge of both layers (overlay, underlay) and nodes (routers/clients and optical nodes/servers). The PCE 16 may be configured for use in an SDN (Software Defined Network), for example. The PCE 16 computes paths through the network and may be located at a router, server, or virtualized entity running in a cloud, for example.

The network may include any number of autonomous systems (AS), each controlled by a single technical administration entity and sharing a common routing policy. The autonomous systems are used to divide networks into individual routing domains where local routing policies are applied. Each autonomous system is assigned a unique number (Autonomous System Number (ASN)) that identifies the AS. There may be AS numbers assigned to the client layer (AS client) and server layer (AS server). The clients 10 and servers 12 may be in the same domains or different domains. Thus, the AS numbers for clients and servers may be the same or different.

One or more of the client nodes 10 may include one or more spare interfaces, which may provide standby capacity. In the example shown in FIG. 1, client nodes C1, C2, C3, C4, and C5 each include at least one spare interface. Client node C1 includes two spare interfaces 18a, 18b connected to server S1. Client node C2 includes two spare interfaces 18g, 18h in communication with server S2. Client node C3 includes two spare interfaces 18c, 18d in communication with server S3. Client nodes C4 and C5 each include one spare interface 18f, 18e in communication with server nodes S5 and S6, respectively.

The embodiments described herein provide a mechanism for the client nodes 10 to advertise routes using their spare interfaces. This allows for auto-discovery of the spare interfaces by other nodes in the network (e.g., client nodes 10 or management node 16). Auto-discovery of spare interfaces may be used, for example, to accommodate new services within the client layer or to optimize the client topology. For example, a new service may need more capacity than available on an existing path, or there may be preferred connectivity to better match the traffic matrix to the topology and therefore reduce average latency. The spare interfaces may also be used as a backup or for multi-homing, for example.

Identification of the server domain ID, design of server topology, and continuous capacity planning process within the server layer allows for the addition of a new link between two client nodes 10 connected to the same domain ID using the spare interfaces. For example, if the server layer is an IP/MPLS (Multiprotocol Label Switching) Transport network operating at the granularity of N×1 Tbps and the client layer is an IP VPN (Virtual Private Network) overlay operating at the granularity of m×100 Gbps, and the server domain identification is defined to distinguish different metro regions from one another and from the backbone, then the network may be able to add 100G between two client nodes 10 connected to the same metro or backbone.

The embodiments may also be used for IP (Internet Protocol) over DWDM (Dense Wavelength Division Multiplexing) as the coherent technology benefits and the reach limitation provided by the domain identification should ensure that a lambda between two client nodes connected to the same optical region is likely.

As described below, the client nodes 10 advertise spare interface information via a protocol such as BGP (Border Gateway Protocol), BGP-LS (Link State), IGP (Interior Gateway Protocol), or other suitable protocol. BGP is used to route data between routing domains (autonomous systems). The BGP routers exchange routing information allowing inter-autonomous system routing. The routing information exchanged may include various attributes including a next-hop attribute. Forwarding of packets within the AS may be done using IGP.

BGP may support multiple address types (e.g., IPv4, IPv6) and each type of address may be identified using an address family identifier (AFI) and a subsequent address family identifier (SAFI). The destinations reachable via a BGP route are referred to as network layer reachability information (NLRI) in BGP. In accordance with one embodiment, a new BGP AFI/SAFI is used to identify a client node 10 with a spare interface connected to the server layer, as described below.

In one embodiment, advertisements containing spare interface information are collected at the management node 16, which provides spare interface information to the client nodes 10 (FIG. 1). In one example, the management node 16 is used to provide optimized use of the spare capacity in an SDN environment.

In another embodiment, advertisements containing spare interface information are collected at the client nodes 10 for a client (router)-based distributed network/service mode of operation.

Figure 2:
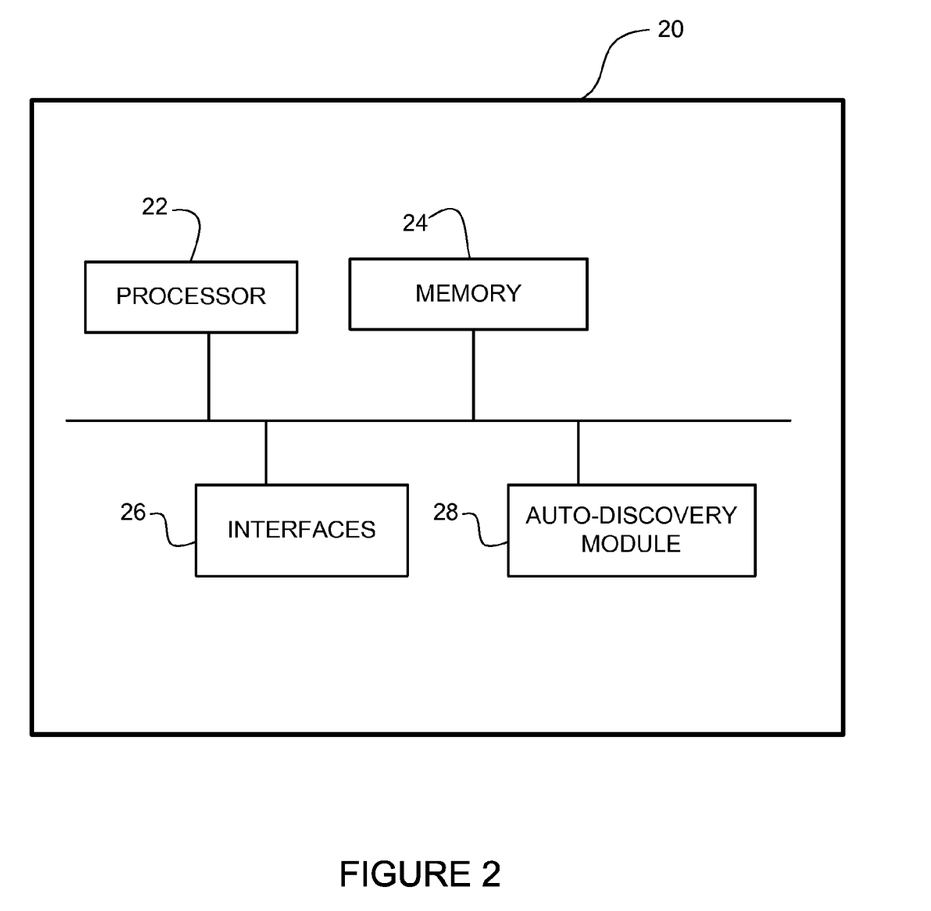
FIG. 2 depicts an example of a network device useful in implementing embodiments described herein.

FIG. 2 illustrates an example of a network device 20 (e.g., client node 10, PCE/NMS 16) that may be used to implement the embodiments described herein. In one embodiment, the network device 20 is a programmable machine that may be implemented in hardware, software, or any combination thereof. The network device 20 includes one or more processor 22, memory 24, network interfaces 26, and auto-discovery module 28.

Memory 24 may be a volatile memory or non-volatile storage, which stores various applications, operating systems, modules, and data for execution and use by the processor 22. For example, memory 24 may include one or more components implemented in software (e.g., auto-discovery module 28), which may be used to advertise spare interfaces or to identify alternate paths based on the information advertised.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 26 may comprise any number of interfaces (linecards, ports) for receiving data or transmitting data to other devices. The network interfaces 26 may include, for example, an Ethernet interface for connection to a computer or network. One or more of the interfaces 26 may be identified as a spare interface.

It is to be understood that the network device 20 shown in FIG. 2 and described above is only an example and that different configurations of network devices may be used. For example, the network device 20 may further include any suitable combination of hardware, software, algorithms, processors, devices, modules, components, or elements operable to facilitate the capabilities described herein.

Figure 3:
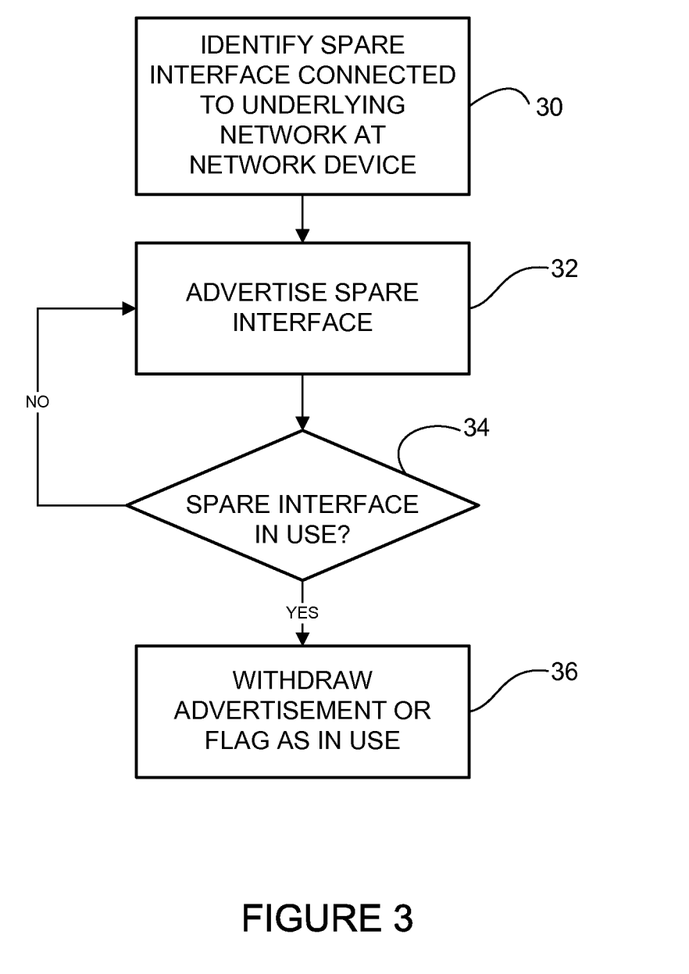
FIG. 3 is a flowchart illustrating an overview of a process for advertising spare capacity at a network device.

FIG. 3 is a flowchart illustrating an overview of a process for advertising spare interface information at a network device (e.g., client node 10 in first network in FIG. 1). The network device 10 identifies spare interfaces connected to the underlying network (second network) (step 30). The spare interface may be, for example, an interface at a client node in communication with a server node in an underlying server network, as shown in FIG. 1. The spare interface information is advertised at step 32. In one embodiment, BGP or IGP is used to advertise the spare interface information. The network device 10 may advertise, for example, connectivity information (e.g., server address, server domain ID) and compatibility information. The compatibility information may include, for example, server compatibility information (e.g., supported modulation, FEC (Forward Error Correction), reach, bandwidth, or other interface related information) or client compatibility information (e.g., type of service, layer 2/layer 3, node placement, aggregation layer, area of service, or other client related information). The spare interface may be advertised periodically or with each BGP advertisement. If the spare interface is in use, the client node 10 may withdraw the advertisement or flag the spare interface as in use (steps 34 and 36).

Figure 4:
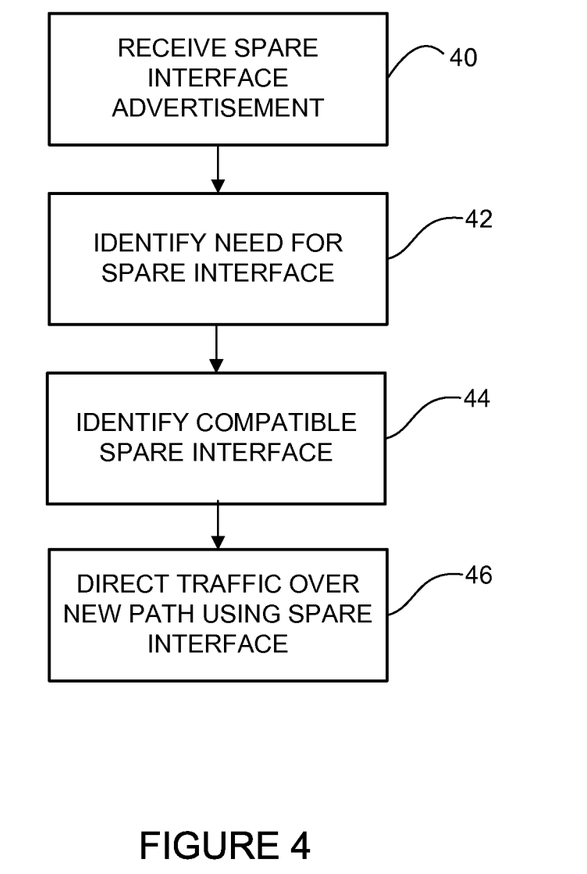
FIG. 4 is a flowchart illustrating an overview of a process for identifying and using the spare capacity.

FIG. 4 is a flowchart illustrating an overview of a process for using the advertised information at a network device (e.g., client node 10, management node 16 in FIG. 1). The network device receives spare interface information advertised by client nodes 10 in the network (step 40). A need for the spare interface (or availability of the spare interface) is identified (step 42). This may include, for example, a need for additional capacity, need for re-optimization of the client topology, or a failure at one of the links or nodes in the network. The network device uses the advertised spare interface information to identify compatible spare interfaces in the network (step 44) and directs traffic over a new path containing the spare interface (step 46).

It is to be understood that the flowcharts shown in FIGS. 3 and 4 are only examples and that steps may be added, removed, or modified, without departing from the scope of the embodiments.

As noted above, in one embodiment, spare interface information is advertised using BGP. The server address of the spare client/server interface is advertised along with the server AS and compatibility information. In one embodiment a new BGP AFI/SAFI is used to advertise the spare interface information. NLRI is the server address of the client interface and the next-hop is the router-ID of the client interface. The first AS in the AS path is the AS of the underlying server domain. The second AS is the AS of the client node.

In one embodiment, a new compatibility attribute is used to convey compatibility information specific to the type of server layer. For example, if the server layer is a DWDM network, the attribute conveys information such as the supported modulation, FEC, reach, bandwidth, or any combination of these or other attributes. The attribute may also include information for client layer compatibility as discussed above.

In another embodiment, the server addresses of the spare client/server interface are advertised as a loopback in the client IGP with a new TLV (type-length-value) extension to convey the server AS and the compatibility information.

In an alternative IGP embodiment, a tagging mechanism is used in place of the TLV. For example, a 'yellow' IGP tag may be defined to represent server domain S1 and compatibility mode m1, while a 'blue' tag may be defined to represent server domain S2 and compatibility mode m2.

The spare interface information advertised by the client node may include an abstraction of properties of the interface based on <type, value> registry, where type may be, for example, IEEE, Cisco, etc. and value refers to a specific interface type of that standard organization or company. A port may advertise different modes (e.g., (IEEE, 1) and (CISCO, 2)) and a basic compatibility matrix would be supported by the vendor for at least its own interface types and well known standardized types.

When an interface changes state (e.g., the interface is connected to a remote interface by a new circuit just created), the redistribution into Layer 3 (L3) BGP (L3 IGP) is preferably updated automatically to reflect the new state of the interface. For example, a different community/tag may be used to reflect that the interface is now used instead of standby mode.

The following describes examples in which the advertised spare interfaces may be used. It is to be understood that these are only examples and that the embodiments described herein may be used in other topologies and spare capacity or failure cases.

Referring again to FIG. 1, in one example, client node C1 advertises BGP route: C1S1 with next-hop C1 and AS path (AS client layer, AS server layer) and compatibility CA1. Client node C2 advertises BGP route: C2S2 with next-hop C2 and AS path (AS client layer, AS server layer) and compatibility CA2. The other client nodes 10, or management node 16 connected to the client layer can then dynamically learn these routes and auto-discover that C1 and C2 are connected to the same server domain (AS server layer) and with compatible spare interfaces. The server addresses of these spare interfaces are also auto-discovered allowing for the client nodes 10 to instantiate a new link between C1 and C2, thereby leveraging the client/server overlay interaction between layers (e.g., using a GMPLS-UNI (Generalized Multiprotocol Label Switching—User Network Interface) overlay model). The client/server layer interaction (GM-PLS-UNI overlay and its extensions) allow for the client to probe the feasibility of links (inquiry process).

In one example, the spare interface provides spare bandwidth to provide additional capacity. For example, a load threshold may be configured for C1's interface to C2. Upon exceeding a certain threshold (e.g., using averaging and churn avoidance technique with dual thresholds), C1 can consult its BGP database (containing new AFI/SAFI) to determine whether C2 has a spare interface that is compatible and connected to the same underlying optical network. If so, C1 can configure its local port at its spare interface to request GMPLS-UNI overlay to create a link to server destination S2 (spare interface to C2), as shown in FIG. 1.

In another example, a failure occurs in one of the links in use between C1 and S1. Management device 16 identifies spare interface 18b and checks to see whether the interface is compatible. If compatibility is found, the spare interface 18b is used to recover from the failure. Once the spare interface is in use, the node may withdraw the 18b spare interface advertisement or flag the interface as being in use.

In another example, a failure occurs at node C4. In this example, nodes C4 and C5 are in communication with the same node or network and spare interface 18e is used to replace node C4 with node C5. In this case, a compatibility check is done to ensure client layer compatibility in addition to server layer compatibility.

In yet another example, the embodiments described herein are used for optimization of the client topology. In this example, C3 is in communication with C4 via server nodes S4 and S6, and C2 and C4 are in communication with the same client node or network. It may be preferred to have C3 to C2 connectivity instead of C3 to C4 connectivity in order to better match the traffic matrix to the topology and reduce average latency. In this case, spare interface 18c (or 18d) is used to create a path from C3 to C2 via S3 and S2.

If a router is connected to a reconfigurable optical add/drop multiplexer (ROADM) via different interfaces, it can receive an optical address per interface as well as one node optical address per optical domain. For example, if C1 has four interfaces a/b/c/d respectively connected to domains 1/1/2/2 then C1 has six optical addresses; one for each interface and one as a node attached to each optical domain. When there are multiple transponder pairs between C1 and C2 and C1 does not want to choose, C1 may send the GMPLS-UNI with its optical node address and C2's optical node address for the domain they have in common. In this case, the ROADM layer does the mapping from optical node to optical port address, which may be done using optical OSPF, for example.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus configured for operation in a first network comprising an overlay network for communication among a plurality of client nodes, the apparatus comprising:
   an interface configured to communicate with a node in a second network comprising an underlying network for communication among a plurality of server nodes, said interface connecting said overlay network to said underlying network;
   a processor configured to identify at the apparatus, said interface as a spare interface and advertise said spare interface to one or more of said client nodes in said overlay network when said spare interface is not in use for communication between said overlay network and said underlying network, wherein advertising said spare interface comprises transmitting connectivity information associated with said underlying network and server or client compatibility information for said spare interface for auto-discovery of said spare interface by said client nodes or a management node; and
   memory for storing said connectivity and compatibility information;
   wherein said spare interface comprises an interface available to accommodate new services within said overlay network, and
   wherein advertisement of said spare interface is used to identify a compatible spare interface in said overlay network and direct traffic over a network path containing said spare interface.

2. The apparatus of claim 1 wherein said compatibility information comprises server layer compatibility information.

3. The apparatus of claim 1 wherein said compatibility information comprises client layer compatibility information.

4. The apparatus of claim 1 wherein the apparatus comprises an IP (Internet Protocol) node and the node in said second network comprises an optical node.

5. The apparatus of claim 1 wherein said connectivity information comprises an address and a domain of the node in said second network.

6. The apparatus of claim 1 wherein advertising said spare interface comprises transmitting a message to a router in said second network.

7. The apparatus of claim 6 wherein said message comprises a Border Gateway Protocol (BGP) message or an Interior Gateway Protocol (IGP) message.

8. The apparatus of claim 1 wherein advertising said spare interface comprises advertising said spare interface to a PCE (Path Computation Element) or NMS (Network Management Station) in an SDN (Software Defined Network) comprising knowledge of said first network and said second network.

9. A method comprising:
   receiving at a node in a first network comprising an overlay network for communication among a plurality of client nodes, information identifying a spare interface between a first network device in said first network and a second network device in a second network, said spare interface information comprising connectivity information associated with an underlying network and server or client compatibility information for said spare interface, wherein said spare interface is not in use for communication between said first network and said second network; and
   using said spare interface to create a path in said first network if said spare interface is compatible;
   wherein said second network comprises said underlying network for communication among a plurality of server nodes and said interface connects said overlay network to said underlying network and is configured to provide spare bandwidth or a backup path and wherein receiving said spare interface information comprises auto-discovering said spare interface to accommodate new services within said overlay network;
   wherein said information identifying said spare interface comprises an advertisement used to identify a compatible spare interface in said overlay network and direct traffic over a network path containing said spare interface.

10. The method of claim 9 wherein said first network device comprises an IP (Internet Protocol) node and said second network device comprises an optical node.

11. The method of claim 9 wherein said spare interface is used in multi-homing.

12. The method of claim 9 wherein the node comprises a PCE (Path Computation Element) or NMS (Network Management Station) in an SDN (Software Defined Network).

13. The method of claim 9 further comprising identifying a need for additional capacity in said first network.

14. The method of claim 9 further comprising identifying a need for re-optimization in said first network.

15. The method of claim 9 further comprising identifying a failure in said first network.

16. The method of claim 9 wherein said first network comprises a multi-domain network.

17. The method of claim 9 wherein said first network comprises a single domain network.

18. An apparatus comprising logic encoded on one or more non-transitory computer readable media for execution and when executed operable to:
   identify at a first network device in a first network, a spare interface between the first network device and a second network device in a second network, wherein said spare interface is not in use for communication between said first network and said second network; and advertise information about said spare interface in said first network to one or more of a plurality of client nodes for auto-discovery of said spare interface by said client nodes or a management node to accommodate new services within an overlay network, wherein said advertisement of said spare interface is used to identify a compatible spare interface in said overlay network and direct traffic over a network path containing said spare interface;

wherein said information comprises connectivity information associated with said underlying network and server or client compatibility information for said spare interface and wherein the first network comprises said overlay network for communication among said plurality of client nodes and the second network comprises an underlying network for communication among a plurality of server nodes, said spare interface connecting said overlay network to said underlying network and configured to provide spare bandwidth or a backup path.

19. The apparatus of claim 18 wherein advertising said spare interface comprises advertising said spare interface to a PCE (Path Computation Element) or NMS (Network Management Station) in an SDN (Software Defined Network).

20. The method of claim 1 wherein said connectivity and compatibility information is used to direct traffic over a new path containing said spare interface.

* * * * *